Nov. 13, 1923. 1,474,239
G. S. COLLINS
LOCKING DEVICE FOR PLUGS
Filed Feb. 14, 1923
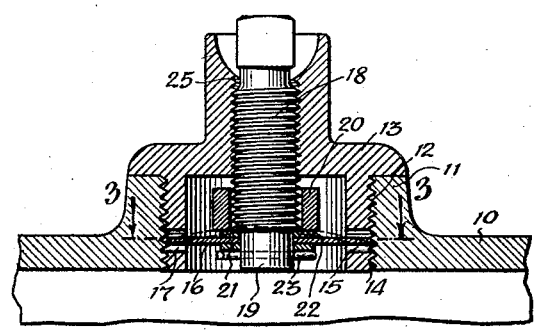
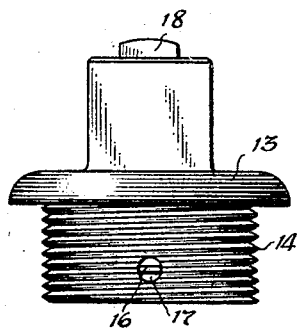
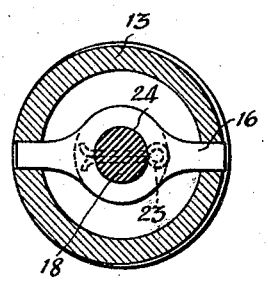
WITNESSES
Frederick Diehl,
E. W. Savage
INVENTOR
GEORGE S. COLLINS
BY
ATTORNEYS Patented Nov. 13, 1923.

1,474,239

UNITED STATES PATENT OFFICE.

GEORGE S. COLLINS, OF MEADVILLE, PENNSYLVANIA.

LOCKING DEVICE FOR PLUGS.

Application filed February 14, 1923. Serial No. 618,943.

*To all whom it may concern:*

Be it known that I, GEORGE S. COLLINS, a citizen of the United States, and a resident of Meadville, in the county of Crawford and State of Pennsylvania, have invented new and useful Improvements in Locking Devices for Plugs, of which the following is a full, clear, and exact description.

This invention relates to locking devices for plugs and the like, and was primarily designed for use with grease plugs and oil cup covers.

The general object of this invention is the provision of a simple and positive locking device for use with plugs of various types to attach them to the wall defining the opening in which they are mounted so as to retain them in position.

A further object of this invention is the provision of a locking device provided with means for limiting its movement so that it may not be made inoperative by adjustment.

These objects are accomplished by providing oppositely disposed openings in the wall of the plug, locating in the plug a curved spring, the ends of which project through the openings in the plug wall, mounting in the plug a set screw which is attached to the spring to serve as a means for straightening the spring to project the spring ends beyond the plug wall for engaging the wall defining an opening in which the plug is mounted, and positioning on the set screw a bushing to limit its movement.

These and other objects of the invention will be more clearly understood from the following detailed description and accompanying drawings:

Figure 1 is a vertical section through the plug, showing its construction;

Figure 2 is a side elevation of the plug;

Figure 3 is a section along the line 3—3, Figure 1.

Referring to the above-mentioned drawings, a portion 10 of the casing is shown. A vertical wall 11 defines an opening leading into the casing and a thread 12 is provided on the inner face of said wall 11. The invention includes a hollow plug 13, the lower end of which is shaped to fit into the opening defined by the wall 11. A thread 14 is provided on the lower end of the plug 13 for engaging the thread 12 in the opening defined by the wall 11. Two oppositely disposed openings 15 and 17 are provided in the wall of the plug 13. A curved spring 16 is located in the plug, the ends projecting through the openings 15 and 17. The length of this spring 16 is greater than the distance across the plug measured at the root of the threads and slightly less than the over-all measurement at the top of the threads. Beveled ends are provided on the ends of the spring 16 so that they will fit into the thread 12 provided on the inner face of the wall 11. In Figure 1, the curved spring is shown in its normal position by the dotted lines.

A set screw 18, the lower end 19 of which is not threaded but reduced in diameter, is mounted in a threaded opening 25 provided in the plug 13. A washer 22 is placed on the lower end 19 of the set screw 18. The end of the set screw is then projected through an opening 24 in the curved spring 16. Another washer 21 is then placed in position on the lower end of the set screw and a cotter pin 23, which projects through an opening provided in the set screw 18, retains the washers and spring in position on the lower end of the set screw. In order to limit the upward movement of the set screw a bushing 20 is mounted on the set screw and located between the washer 22 and the top of the plug 13.

The operation of this plug is as follows:

Normally the spring 16 takes the position shown by the dotted lines in Figure 1, the ends of the spring projecting through the openings 15 and 17. After the plug has been mounted in any opening, the set screw is adjusted, straightening the spring, as shown in full lines in Figure 1. This projects the ends of the spring outward into engagement with the wall 11, thus locking the plug in position. During the straightening operation of the spring 16 the ends of the spring engage the thread 12, and the set screw as it is projected downward forces the ends of the spring outward. The bushing 20 serves to limit the upward movement of the set screw so that the ends of the spring 16 may not be drawn completely out of engagement with the thread 12.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A device of the character described, comprising a hollow plug having openings extending through its wall, a curved spring mounted in said hollow plug, the ends extending through said openings, means mounted in the plug for straightening the spring to project its ends beyond the walls of the plug, and means for limiting the movement of said means provided for straightening the spring.

2. In a locking device for plugs provided for closing openings a plug having openings in its wall, a curved spring mounted in the plug, the ends of said spring projecting through said openings in the plug wall, and a set screw mounted in the plug for straightening said spring to project its ends beyond the plug wall to engage the wall defining the opening in which the plug is mounted.

3. A device of the character described, comprising a hollow plug having openings oppositely disposed in its wall, a curved spring mounted in the hollow plug, the ends projecting through said oppositely disposed openings, a set screw mounted in the plug for straightening said spring to project its ends beyond the plug wall, and means for limiting the movement of said set screw.

4. A device of the character described, comprising a hollow plug having oppositely disposed openings extending through its wall, a set screw mounted in said plug, a curved spring mounted in said plug with its ends projecting through the oppositely disposed openings, said spring being attached to the set screw, and a bushing mounted on the set screw to limit its movement.

5. In a locking device for plugs for closing openings, a plug having openings in its wall, a deformable spring mounted in said plug, the ends extending through said openings in the plug wall, and means mounted in the plug for deforming said spring to project its ends beyond the plug wall to engage the wall defining the opening in which the plug is mounted.

GEORGE S. COLLINS.